US012649247B2

(12) United States Patent
Ida et al.

(10) Patent No.: US 12,649,247 B2
(45) Date of Patent: Jun. 9, 2026

(54) VERTICAL ARTICULATED ROBOT

(71) Applicant: NACHI-FUJIKOSHI CORP., Tokyo (JP)

(72) Inventors: Shinya Ida, Toyama (JP); Hiroki Iida, Toyama (JP)

(73) Assignee: NACHI-FUJIKOSHI CORP., Tokyo (JP)

( * ) Notice: Subject to any disclaimer, the term of this patent is extended or adjusted under 35 U.S.C. 154(b) by 0 days.

(21) Appl. No.: 19/200,673

(22) Filed: May 7, 2025

(65) Prior Publication Data

US 2025/0345953 A1 Nov. 13, 2025

(30) Foreign Application Priority Data

May 8, 2024 (JP) ................................. 2024-075717

(51) Int. Cl.
B25J 17/02 (2006.01)
B25J 9/10 (2006.01)
(52) U.S. Cl.
CPC ........... B25J 17/0258 (2013.01); B25J 9/102 (2013.01)
(58) Field of Classification Search
CPC .... B25J 17/0258; B25J 9/102; B25J 15/0014; B25J 15/0052
See application file for complete search history.

(56) References Cited

U.S. PATENT DOCUMENTS

| | | | | |
|---|---|---|---|---|
| 2014/0341700 A1* | 11/2014 | Vopat | ................... | B25J 15/0052 |
| | | | | 294/81.1 |
| 2019/0030726 A1* | 1/2019 | Furukawa | ............ | B25J 15/0052 |
| 2024/0342930 A1* | 10/2024 | Ida | ........................... | B25J 18/00 |
| 2025/0002268 A1* | 1/2025 | Rogers | ................... | B25J 9/0042 |

FOREIGN PATENT DOCUMENTS

| | | |
|---|---|---|
| JP | 60-044288 A | 3/1985 |
| JP | 61-044591 A | 3/1986 |
| JP | 2011-000659 A | 1/2011 |

OTHER PUBLICATIONS

Office action issuer on Jul. 30, 2024 by Japan Patent Office.
Office action issuer on Oct. 15, 2024 by Japan Patent Office.

* cited by examiner

*Primary Examiner* — Terence Boes
(74) *Attorney, Agent, or Firm* — Apex Juris, pllc

(57) ABSTRACT

A vertical articulated robot with a double hand mechanism for weight reduction and space efficiency of a wrist unit. The robot includes: a wrist unit with first and second hands; a fifth axis for wrist unit rotation; sixth and seven axes for first and second hands rotation; fifth, sixth, and seventh axis motors, parallelly housed within the holding arm; a first intermediate axis, coaxial with the fifth axis and operatable due to the sixth axis motor; a second gear, on which the sixth axis is journaled, in mesh with a first gear, on which the first intermediate axis is journaled; a second intermediate axis, coaxial with the fifth axis and the first intermediate axis and rotatable due to the seventh axis; and a fourth gear, on which the seventh axis is journaled, in mesh with a third gear, on which the second intermediate axis is journaled.

1 Claim, 3 Drawing Sheets

VERTICAL ARTICULATED ROBOT

CROSS-REFERENCE TO RELATED APPLICATION

This application claims priory to Japanese patent application number 2024-75717, filed on May 8, 2024, the entire contents of which are incorporated herein by reference.

BACKGROUND OF THE INVENTION

Field of the Invention

The present invention relates to a vertical articulated robot equipped with a double hand.

Conventionally, horizontally articulated robots (SCARA robots) are often used as robots for transporting substrates. An end of an arm of the horizontally articulated robot is equipped with an end effector, such as a hand, for mounting the substrate (for example, Patent Document 1; JP-A-2011-659).

Description of the Related Art

Patent Document 1 discloses a so-called double hand robot. In this double hand robot, two hands are connected in two tiers at a distal end of the arm. Each of the two hands can rotate independently around a hand rotation axis at the distal end of the arm.

SUMMARY OF THE INVENTION

To solve the above problems, a representative configuration of the vertical articulated robot according to the present invention includes:
   a first arm; a wrist unit, to which the first arm is coupled, including a first hand and a second hand; a wrist axis, to which the wrist unit is rotatably coupled in a tilting direction relative to the first arm; a first hand axis, to which the wrist unit is coupled, about which the first hand is rotatably supported in a direction perpendicular to a rotational direction of the wrist unit;
   a second hand axis, to which the wrist unit is coupled, about which the second hand is coaxially rotatable with the first hand axis; a wrist axis motor, a first hand axis motor, and a second hand axis motor, functioning as drive sources for the wrist axis, the first hand axis, and the second hand axis, which are housed in the first arm and are arranged respectively in parallel; a first intermediate axis, which is coaxially positioned with the wrist axis and is rotatable due to a driving force from the first hand axis motor; a first gear, on which the first intermediate axis is journaled; a second gear, on which the first hand axis is coaxially journaled, which is in mesh with the first gear; a second intermediate axis, which is coaxially positioned with the wrist axis and first intermediate axis and is operatable due to a driving force from the second hand axis motor; a third gear, on which the second intermediate axis is journaled; and a fourth gear, on which the second hand axis is journaled, which is in mesh with the third gear.

DESCRIPTION OF THE EMBODIMENTS

Figure 1:
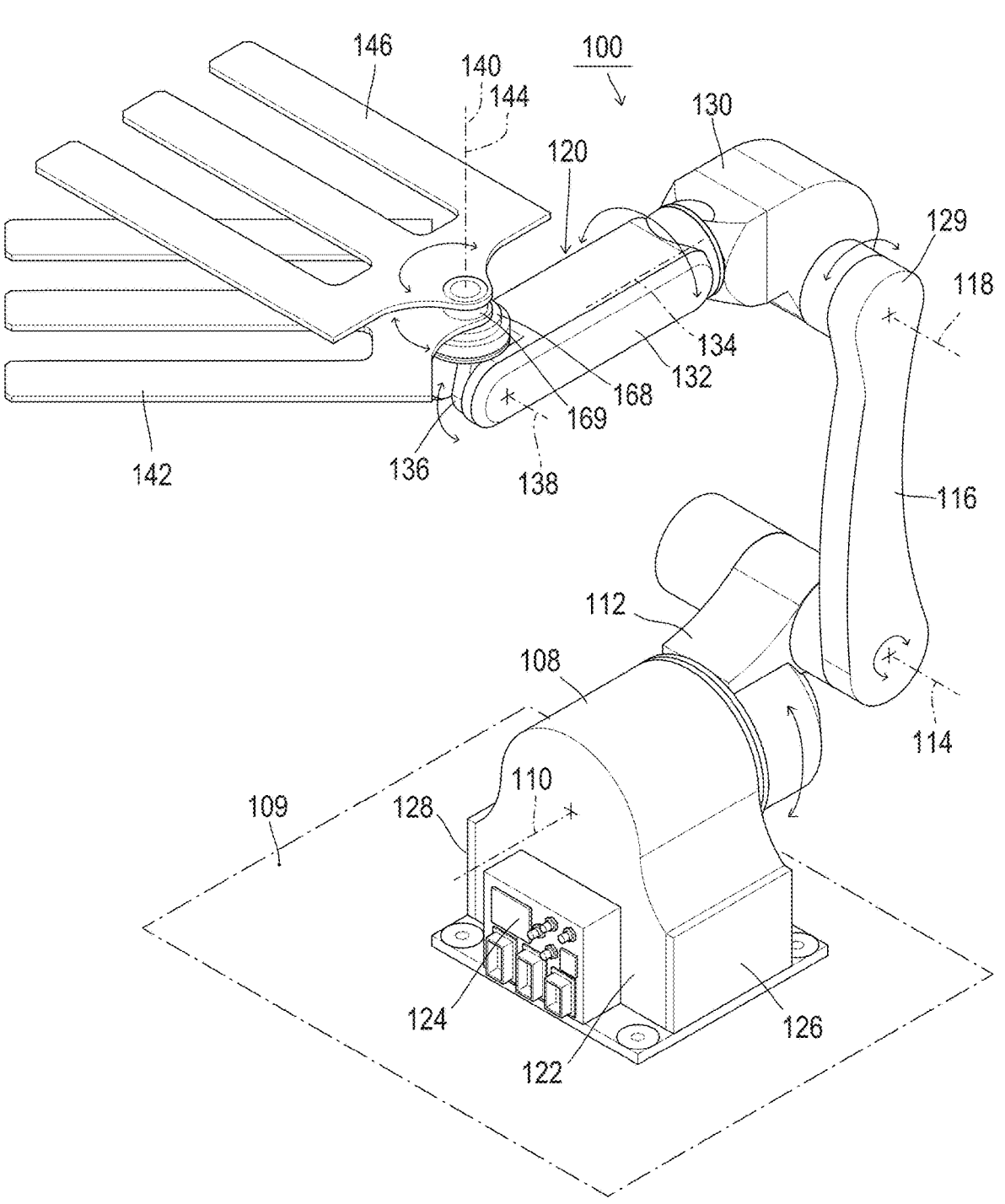
FIG. 1 is a perspective view illustrating an overall configuration of a vertical articulated robot in an embodiment of the present invention.

A preferred embodiment of the present invention will be described in detail below with reference to the attached drawings. The dimensions, materials, and other specific numerical values shown in the embodiment are merely exemplary to facilitate understanding of the invention and do not limit the invention unless otherwise specified. Furthermore, in this specification and drawings, elements having substantially the same functions and configurations are denoted by the same reference numerals to omit redundant explanations, and elements that are not directly related to the invention are omitted from the illustrations.

FIG. 1 is a perspective view illustrating an overall configuration of a vertical articulated robot 100 in an embodiment of the present invention. The vertical articulated robot 100 is an industrial robot used, for example, to transport workpieces such as substrates.

In brief, the vertical articulated robot 100 in the embodiment differs from general vertical articulated robots in a rotational direction of a first axis and is configured so that an operating range of an upper arm and a lower arm is directed upward. The vertical articulated robot 100 is, for example, a seven-axis robot and includes a base 108, a first axis 110, a swivel frame 112, a second axis 114, a lower arm 116, a third axis 118, and an upper arm 120. As described later, the upper arm 120 has a connecting arm 130, a fourth axis 134, and a holding arm (first arm) 132, which are rotated together by the third axis 118 and fourth axis 134.

The base 108 is installed on a factory floor or similar surface. A connector 124 to which harness is connected is mounted on a side surface 122 of the base 108. The connector 124 may also be installed on other side surfaces 126 and 128 of the base 108 in consideration of a direction in which harness is routed.

The first axis 110 is supported in a direction parallel to an installation surface 109, which is a surface on which the base 108 is mounted, when the base 108 is mounted on a floor (hereinafter referred to as a horizontal direction). The swivel frame 112 is rotated by the first axis 110. The second axis 114 is supported by the swivel frame 112 in a direction perpendicular to the first axis 110. The lower arm 116 is rotated by the second axis 114. In other words, the rotational direction of the second axis 114 is a direction in which an angle between the lower arm 116 and the first axis 110 changes. The third axis 118 is supported in parallel with the second axis 114 at a distal end 129, which is an end located on the opposite side of the second axis 114 of the lower arm 116.

The upper arm 120 has the connecting arm 130, a fourth axis 134, and a holding arm 132, which are rotated together by the third axis 118 and the fourth axis 134. The connecting arm 130 is rotatably connected to the lower arm 116 via the third axis 118. The holding arm 132 is rotatably connected to the connecting arm 130 via the fourth axis 134, which extends in a longitudinal direction of the holding arm 132, allowing it to twist around the fourth axis 134.

A wrist unit 136 is coupled to the distal end side of the holding arm 132. The wrist unit 136 rotates in a tilting direction rather than a twisting direction via a fifth axis (wrist axis) 138 relative to the holding arm 132. The wrist unit 136, for example, is equipped with a first hand 142 and a second hand 146, which serve as end effectors for mounting workpieces thereon. Accordingly, the vertical articulated robot 100 adopts a so-called double hand structure.

The first hand 142 rotates via the sixth axis (first hand axis) 140 in a direction perpendicular to the rotational direction of the wrist unit 136 (twisting direction). The second hand 146 rotates via the seventh axis (second hand axis) 144, which is coaxial with the sixth axis 140, in a direction perpendicular to the rotational direction of the wrist unit 136. Additionally, the fifth axis 138, the sixth axis 140, and the seventh axis 144 are supported by the wrist unit 136 in a direction perpendicular to the fourth axis 134.

In this manner, the vertical articulated robot 100 is configured with the first axis 110 arranged in a horizontal direction, allowing the swivel frame 112 to rotate in a substantially vertical direction relative to the installation surface 109. As a result, the axes and the arms following the second axis 114 can perform a substantially vertical circular motion relative to the installation surface 109 due to the first axis 110.

Figure 2:
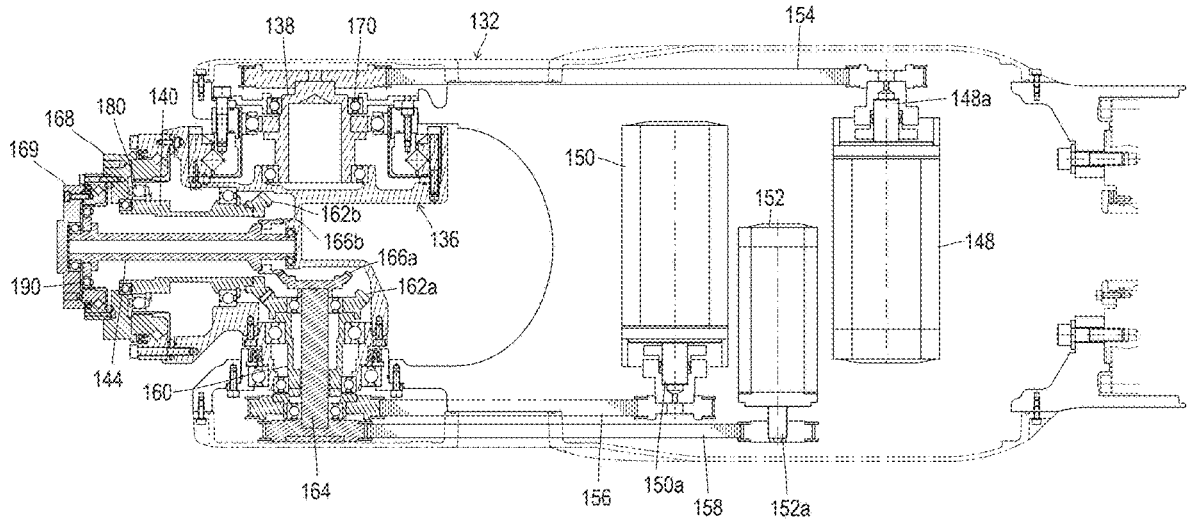
FIG. 2 is a partial cross-sectional view explaining an essential part of a holding arm (first arm) in FIG. 1.
Figure 3:
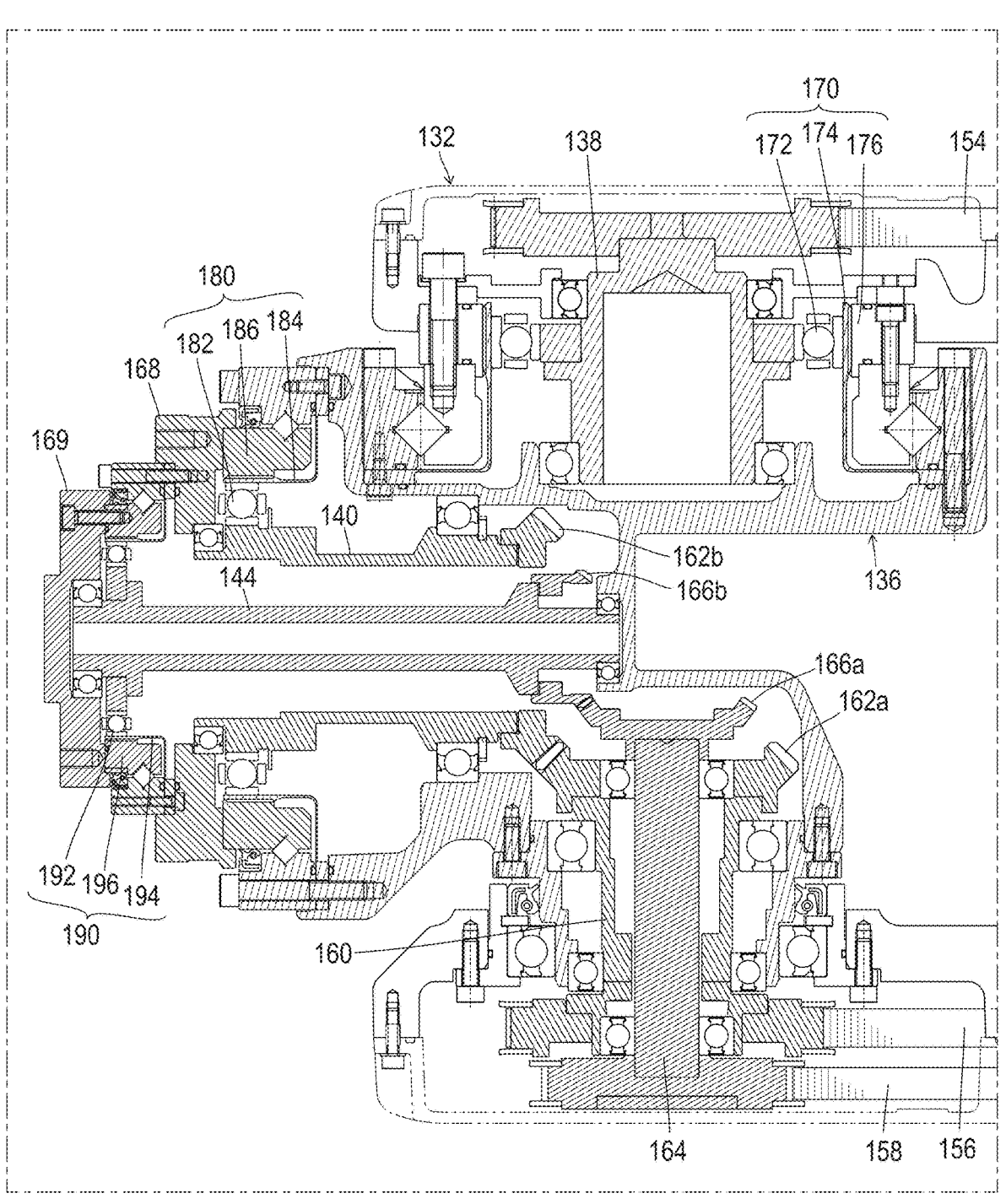
FIG. 3 is a partially enlarged cross-sectional view of a portion of the holding arm (first arm) in FIG. 2.

FIG. 2 is a partial cross-sectional view illustrating an essential part of the holding arm (first arm) 132 of FIG. 1. FIG. 3 is a partial cross-sectional view showing an enlarged portion of the holding arm (first arm) 132 of FIG. 2. In the drawings, an internal structure of the holding arm 132 and the wrist unit 136 of the vertical articulated robot 100 is depicted.

As shown in FIG. 2, the vertical articulated robot 100 includes a fifth axis motor (wrist-axis motor) 148, a sixth axis motor (first hand axis motor) 150, and a seventh axis motor (second hand axis motor) 152 within the holding arm 132. The fifth axis motor 148, the sixth axis motor 150, and the seventh axis motor 152 each have motor shafts 148a, 150a, and 152a, respectively, and serve as the drive sources for the fifth axis 138, the sixth axis 140, and the seventh axis 144.

The three motors, namely the fifth axis motor 148, the sixth axis motor 150, and the seventh axis motor 152, are housed within the holding arm 132, as illustrated. Furthermore, the three motors, including the motor shafts 148a, 150a, and 152a, are arranged in parallel to each other as a whole.

The driving force of the fifth axis motor 148 is transmitted to the fifth axis 138 via a timing belt 154. The timing belt 154 is arranged to bridge between the motor shaft 148a of the fifth axis motor 148 and the fifth axis 138, which rotates the wrist unit 136. As a result, by driving the fifth axis motor 148, the fifth axis 138 can be rotated.

As described above, the fifth axis 138 rotates by driving the fifth axis motor 148 and transmits driving force to the wrist unit 136 while being decelerated through a harmonic drive 170. As a result, the wrist unit 136 rotates relative to the holding arm 132 while being decelerated via the fifth axis 138 and the harmonic drive 170. It should be noted that in FIG. 2 and FIG. 3, hatching is applied to the components that move together with the fifth axis 138.

As shown in FIG. 3, the harmonic drive 170 includes a bearing 172, a flexspline (external gear) 174, and a circular spline (internal gear) 176. In the harmonic drive 170, the outer circular spline 176 is fixed, while the flexspline 174, which is positioned inside the circular spline 176, rotates as the wrist unit 136.

The driving force of the sixth axis motor 150 is transmitted to the first intermediate axis 160 via a timing belt 156. The first intermediate axis 160 is arranged coaxially with the fifth axis 138. The timing belt 156 is arranged to bridge between the motor shaft 150a of the sixth axis motor 150 and the first intermediate axis 160.

The first gear 162a is a bevel gear journaled on the first intermediate axis 160. The second gear 162b is a bevel gear journaled coaxially on the sixth axis 140 and meshes with the first gear 162a. Therefore, when the sixth-axis motor 150 is driven, the first gear 162a rotates along with the first intermediate axis 160, and the second gear 162b, which meshes with the first gear 162a, rotates along with the sixth axis 140. As a result, by driving the sixth axis motor 150, the sixth axis 140 can be rotated.

The sixth axis 140 transmits driving force to the plate 168 while being decelerated through a harmonic drive 180. The first hand 142 is coupled to the plate 168. As a result, the first hand 142 rotates in a direction perpendicular to the rotational direction of the wrist unit 136. It should be noted that in FIG. 2 and FIG. 3, hatching is applied to the components that move together with the sixth axis 140.

As shown in FIG. 3, the harmonic drive 180 includes a bearing 182, a flexspline (external gear) 184, and a circular spline (internal gear) 186. In the harmonic drive 180, the flexspline 184 is fixed to the wrist unit 136, while the circular spline 186, which is positioned outside the flexspline 184, rotates as the sixth axis 140.

Additionally, as illustrated, the sixth axis 140 has a cylindrical shape and has the seventh axis 144 arranged coaxially inside thereof. Furthermore, both the sixth axis 140 and the seventh axis 144 are coupled to the wrist unit 136.

The driving force of the seventh axis motor 152 is transmitted to the second intermediate axis 164 via a timing belt 158. The second intermediate axis 164 is arranged coaxially with the fifth axis 138 and the first intermediate axis 160. The timing belt 158 is arranged to bridge between the motor shaft 152a of the seventh axis motor 152 and the second intermediate axis 164.

The third gear 166a is a bevel gear journaled coaxially on the second intermediate axis 164 and is arranged coaxially with the first gear 162a. The fourth gear 166b is a bevel gear journaled coaxially on the seventh axis 144, is arranged coaxially with the second gear 162b, and further meshes with the third gear 166a.

Therefore, when the seventh-axis motor 152 is driven, the third gear 166a rotates along with the second intermediate axis 164, and the fourth gear 166b, which meshes with the third gear 166a, rotates along with the seventh axis 144. As a result, by driving the seventh axis motor 152, the seventh axis 144 can be rotated.

The seventh axis 144 transmits driving force to the plate 169 while being decelerated through the harmonic drive 190. The second hand 146 is coupled to the plate 169. As a result, the second hand 146 rotates coaxially with the first hand 142. It should be noted that in FIG. 2 and FIG. 3, hatching is applied to the components that move together with the seventh axis 144.

As shown in FIG. 3, a harmonic drive 190 includes a bearing 192, a flexspline (external gear) 194, and a circular spline (internal gear) 196. In the harmonic drive 190, the flexspline 194 is fixed, while the circular spline 196, which is positioned outside the flexspline 194, rotates as the seventh axis 144.

As described above, in the vertical articulated robot 100, the three motors, namely, the fifth axis motor 148, the sixth axis motor 150, and the seventh axis motor 152, are arranged in parallel and housed within the holding arm 132.

Additionally, in the wrist unit 136, the first intermediate axis 160, the second intermediate axis 164, the first gear 162*a*, and the third gear 166*a* are arranged coaxially with the fifth axis 138. Furthermore, in the wrist unit 136, the sixth axis 140, the seventh axis 144, the second gear 162*b*, and the fourth gear 166*b* are also arranged coaxially.

Therefore, according to the vertical articulated robot 100, by arranging the components as described above, it is possible to house three motors within the holding arm (first arm) 132. Consequently, even when adopting a double hand configuration in which the first hand 142 and the second hand 146 are coupled to the wrist unit 136, it is possible to reduce weight and improve space efficiency of the wrist unit 136.

As described above, the preferred embodiment of the present invention has been explained with reference to the accompanying drawings. However, it goes without saying that the present invention is not limited to substrate transport applications. The present invention is a versatile vertical articulated robotic structure that can also be used for handling and loading applications in confined layouts. It is evident to those skilled in the art that various modifications and alterations can be conceived within the scope defined by the claims, and such modifications and alterations are naturally understood to fall within the technical scope of the present invention.

The present invention can be utilized as a vertical articulated robot equipped with a double hand.

What we claim is:

1. A vertical articulated robot, comprising:

a first arm;

a wrist unit, to which the first arm is coupled, including a first hand and a second hand;

a wrist axis that is positioned in a direction orthogonal to a direction in which the first arm extends, about which the wrist unit is rotatable;

a first hand axis, to which the wrist unit is coupled, positioned in a direction orthogonal to the wrist axis, about which the first hand is rotatable;

a second hand axis, to which the wrist unit is coupled, about which the second hand is coaxially rotatable with the first hand axis;

a wrist axis motor, a first hand axis motor, and a second hand axis motor, functioning as drive sources for the wrist axis, the first hand axis, and the second hand axis, which are housed in the first arm and are arranged in parallel;

a first intermediate axis, which is coaxially positioned with the wrist axis and is operatable due to a driving force from the first hand axis motor;

a first gear, on which the first intermediate axis is journaled;

a second gear, on which the first hand axis is coaxially journaled, which is in mesh with the first gear;

a second intermediate axis, which is coaxially positioned with the wrist axis and first intermediate axis and is operatable due to a driving force from the second hand axis motor;

a third gear, on which the second intermediate axis is journaled; and a fourth gear, on which the second hand axis is journaled, which is in mesh with the third gear.

\* \* \* \* \*